(12) United States Patent
Yang

(10) Patent No.: US 10,785,780 B2
(45) Date of Patent: Sep. 22, 2020

(54) NETWORK SYSTEM AND NETWORK COMMUNICATION METHOD

(71) Applicant: HUAWEI TECHNOLOGIES CO., LTD., Shenzhen, Guangdong (CN)

(72) Inventor: Zanfeng Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/907,162

(22) Filed: Feb. 27, 2018

(65) Prior Publication Data

US 2018/0192429 A1    Jul. 5, 2018

Related U.S. Application Data

(63) Continuation of application No. PCT/CN2016/088655, filed on Jul. 5, 2016.

(30) Foreign Application Priority Data

Aug. 28, 2015    (CN) .......................... 2015 1 0543193

(51) Int. Cl.
*H04W 72/12*     (2009.01)
*H04L 29/12*     (2006.01)
(Continued)

(52) U.S. Cl.
CPC .... *H04W 72/1205* (2013.01); *H04L 29/06115* (2013.01); *H04L 61/1511* (2013.01); *H04L 67/2842* (2013.01); *H04L 69/16* (2013.01); *H04L 69/163* (2013.01); *H04W 28/0268* (2013.01); *H04W 40/02* (2013.01); *H04L 61/256* (2013.01); *H04L 61/2514* (2013.01); *H04L 61/2596* (2013.01);
(Continued)

(58) Field of Classification Search
None
See application file for complete search history.

(56) References Cited

U.S. PATENT DOCUMENTS 9,167,478 B2 * 10/2015 Nadas ................... H04W 28/14
9,405,685 B2 *  8/2016 Lee ..................... G06F 12/0802
(Continued)

FOREIGN PATENT DOCUMENTS

CN          1665238 A      9/2005
CN        101193408 A      6/2008
(Continued)

OTHER PUBLICATIONS

Extended European Search Report issued in European Application No. 16840676.7 dated Apr. 20, 2018, 7 pages.
(Continued)

*Primary Examiner* — Yaotang Wang
(74) *Attorney, Agent, or Firm* — Fish & Richardson P.C.

(57) ABSTRACT

The present disclosure provides a network system and a network communication method. In some implementations, a cache server or an application server is moved from an IDC equipment room in a metropolitan area network to a local radio access network or an IP transport network between the radio access network and a wireless core network, and an edge node is deployed to steer a TCP packet for a central server to the cache server or the application server, to implement traffic scheduling.

20 Claims, 12 Drawing Sheets

(51) Int. Cl.
  *H04L 29/08* (2006.01)
  *H04L 29/06* (2006.01)
  *H04W 40/02* (2009.01)
  *H04W 28/02* (2009.01)
  *H04W 8/08* (2009.01)
  *H04W 36/02* (2009.01)

(52) U.S. Cl.
  CPC ............ *H04L 69/22* (2013.01); *H04W 8/082* (2013.01); *H04W 36/02* (2013.01)

(56) References Cited

U.S. PATENT DOCUMENTS

| | | | |
|---|---|---|---|
| 2004/0218575 A1* | 11/2004 | Ibe | ................... H04W 36/0011 370/338 |
| 2008/0133830 A1 | 6/2008 | Nitta et al. | |
| 2009/0262741 A1* | 10/2009 | Jungck | ............. H04L 29/12066 370/392 |
| 2011/0231475 A1 | 9/2011 | Van Der Merwe et al. | |
| 2011/0320592 A1* | 12/2011 | Kemmerer, Jr. | .... H04L 41/0896 709/224 |
| 2013/0326026 A1* | 12/2013 | Lee | .................... H04L 67/1097 709/219 |
| 2013/0326133 A1 | 12/2013 | Lee et al. | |
| 2014/0233387 A1 | 8/2014 | Zheng et al. | |
| 2015/0341449 A1 | 11/2015 | Lee et al. | |

FOREIGN PATENT DOCUMENTS

| | | |
|---|---|---|
| CN | 101938483 A | 1/2011 |
| CN | 103095597 A | 5/2013 |
| CN | 103455439 A | 12/2013 |
| CN | 103457993 A | 12/2013 |
| KR | 20140144321 A | 12/2014 |

OTHER PUBLICATIONS

International Search Report issued in International Application No. PCT/CN2016/088655.

Office Action issued in Chinese Application No. 201510543193.X dated Mar. 15, 2019, 18 pages.

* cited by examiner

ND NETWORK
NETWORK SYSTEM AND NETWORK COMMUNICATION METHOD

CROSS-REFERENCE TO RELATED APPLICATIONS

This application is a continuation of International Application No. PCT/CN2016/088655, filed on Jul. 5, 2016, which claims priority to Chinese Patent Application No. 201510543193.X, filed on Aug. 28, 2015. The disclosures of the aforementioned applications are hereby incorporated by reference in their entireties.

TECHNICAL FIELD

Embodiments of the present invention relate to the communications field, and more specifically, to a network system and a network communication method.

BACKGROUND

A content delivery network (Content Delivery Network, CDN) is a content delivery and traffic allocation network that is constructed on a basic Internet Protocol (Internet Protocol, IP) bearer network and that caters to a variety of service requirements. An objective of the CDN is to add a new layer of network architecture to the existing Internet (Internet) and publish application content of a website to a network "edge" closest to user equipment. In this way, the user equipment can obtain required content in the proximity, instead of obtaining the content from an application server. This can resolve a problem of Internet network congestion, and increase a response speed when the user equipment visits the website.

The content delivery network can deliver content of a source server to serving nodes that are deployed in a distributed manner. By using a traffic scheduling technology, a user request can be automatically steered to a globally optimal serving node according to a specified policy, and the node serves a user in the proximity. However, in an existing CDN solution, a serving node is usually deployed in an Internet Data Center (Internet Data Center, IDC) equipment room in a metropolitan area network. Therefore, there is a relatively long delay when a mobile network user accesses the serving node, and user experience is relatively poor.

SUMMARY

Embodiments of the present invention provide a network system and a network communication method, so as to reduce a delay when user equipment accesses a serving node and improve user experience.

According to a first aspect, a network system, used for content delivery, is provided and includes: a third-party server and an edge node that are located in a radio access network or an Internet Protocol IP transport network between the radio access network and a wireless core network, where the edge node is configured to steer a Transmission Control Protocol TCP packet that is of user equipment for a central server and that corresponds to a TCP connection to the third-party server, and the third-party server includes an application server or a cache server, and is configured to store delivery data of the central server and respond to the TCP packet according to the delivery data.

With reference to the first aspect, in a first possible implementation of the first aspect, the network system further includes: a central node located in the wireless core network, where the edge node is further configured to register the TCP connection with the central node, so that the central node learns that the third-party server has already served the user equipment at the edge node.

With reference to the first possible implementation of the first aspect, in a second possible implementation of the first aspect, the edge node is specifically configured to: determine and store an IP address that needs to be steered; and perform destination network address translation DNAT on the TCP packet according to the IP address that needs to be steered, so as to steer the TCP packet to the third-party server.

With reference to the second possible implementation of the first aspect, in a third possible implementation of the first aspect, the edge node is specifically configured to parse a domain name system DNS response message corresponding to a DNS request message sent by the user equipment, to obtain the IP address that needs to be steered.

With reference to the second possible implementation of the first aspect, in a fourth possible implementation of the first aspect, the edge node is specifically configured to obtain, from a network management system, the IP address that needs to be steered.

With reference to the second possible implementation of the first aspect, in a fifth possible implementation of the first aspect, the edge node is specifically configured to obtain, from the central node, the IP address that needs to be steered.

With reference to the first possible implementation of the first aspect, in a sixth possible implementation of the first aspect, the edge node is specifically configured to: receive a DNS request message sent by the user equipment; and send a DNS response message to the user equipment, where the DNS response message carries an IP address of the third-party server.

With reference to any one of the second to the fifth possible implementations of the first aspect, in a seventh possible implementation of the first aspect, when the user equipment is handed over from a first base station cell that includes the edge node to a second base station cell, the central node is further configured to: replicate and encapsulate an uplink TCP packet sent by the user equipment, and forward a replicated and encapsulated uplink TCP packet to the edge node, so that the edge node learns that the user equipment has already been handed over from the first base station cell to the second base station cell; the edge node is further configured to: after decapsulating the replicated and encapsulated uplink TCP packet, perform DNAT on the uplink TCP packet according to the IP address that needs to be steered, and forward a translated uplink TCP packet to the third-party server; and after performing source network address translation SNAT on a downlink TCP packet received from the third-party server, replicate and encapsulate a translated downlink TCP packet, and forward a replicated and encapsulated downlink TCP packet to the central node; and the central node is further configured to: after decapsulating the replicated and encapsulated downlink TCP packet, forward a decapsulated downlink TCP packet to the user equipment.

With reference to the sixth possible implementation of the first aspect, in an eighth possible implementation of the first aspect, when the user equipment is handed over from a first base station cell that includes the edge node to a second base station cell, the central node is further configured to: replicate and encapsulate an uplink TCP packet sent by the user equipment, and forward a replicated and encapsulated uplink TCP packet to the edge node, so that the edge node learns that the user equipment has already been handed over from the first base station cell to the second base station cell;

the edge node is further configured to: after decapsulating the replicated and encapsulated uplink TCP packet, forward the uplink TCP packet to the third-party server; replicate and encapsulate a downlink TCP packet received from the third-party server, and forward a replicated and encapsulated downlink TCP packet to the central node; and the central node is further configured to: after decapsulating the replicated and encapsulated downlink TCP packet, forward a decapsulated downlink TCP packet to the user equipment.

With reference to the seventh or the eighth possible implementation of the first aspect, in a ninth possible implementation of the first aspect, when a first edge node is deployed in the second base station cell, the first edge node determines, according to whether the uplink TCP packet belongs to a newly established TCP connection, whether the uplink TCP packet is steered to a third-party server corresponding to the second base station cell.

With reference to any one of the first to the ninth possible implementations of the first aspect, in a tenth possible implementation of the first aspect, the central node is further configured to perform data delivery on the third-party server according to location information of the edge node.

With reference to any one of the first aspect or the first to the tenth possible implementations of the first aspect, in an eleventh possible implementation of the first aspect, the edge node is further configured to report traffic usage of interaction between the third-party server and the user equipment to the central node; and the central node is further configured to perform charging processing according to the reported traffic usage, so that a charging system performs charging.

With reference to any one of the first aspect or the first to the eleventh possible implementations of the first aspect, in a twelfth possible implementation of the first aspect, the third-party server is further configured to obtain, from the central server, data corresponding to the IP address that needs to be steered.

According to a second aspect, a network communication method is provided, where the network system to which the method is applied includes a third-party server and an edge node that are located in a radio access network or an Internet Protocol IP transport network between the radio access network and a wireless core network, and the method includes: steering, by the edge node, a Transmission Control Protocol TCP packet that is of user equipment for a central server and that corresponds to a TCP connection to the third-party server; and storing, by the third-party server, delivery data of the central server, and responding to the TCP packet according to the delivery data, where the third-party server includes an application server or a cache server.

With reference to the second aspect, in a first possible implementation of the second aspect, the network system further includes a central node located in the wireless core network, and the method further includes: registering, by the edge node, the TCP connection with the central node, so that the central node learns that the third-party server has already served the user equipment at the edge node.

With reference to the first possible implementation of the second aspect, in a second possible implementation of the second aspect, the steering, by the edge node, a Transmission Control Protocol TCP packet that is of user equipment for a central server and that corresponds to a TCP connection to the third-party server includes: determining and storing, by the edge node, an IP address that needs to be steered; and performing destination network address translation DNAT on the TCP packet according to the IP address that needs to be steered, so as to steer the TCP packet to the third-party server.

With reference to the second possible implementation of the second aspect, in a third possible implementation of the second aspect, the determining, by the edge node, an IP address that needs to be steered includes: parsing, by the edge node, a domain name system DNS response message corresponding to a DNS request message sent by the user equipment to obtain the IP address that needs to be steered.

With reference to the second possible implementation of the second aspect, in a fourth possible implementation of the second aspect, the determining, by the edge node, an IP address that needs to be steered includes: obtaining, by the edge node from a network management system, the IP address that needs to be steered.

With reference to the second possible implementation of the second aspect, in a fifth possible implementation of the second aspect, the determining, by the edge node, an IP address that needs to be steered includes: obtaining, by the edge node from the central node, the IP address that needs to be steered.

With reference to the first possible implementation of the second aspect, in a sixth possible implementation of the second aspect, before the steering, by the edge node, a Transmission Control Protocol TCP packet that is of user equipment for a central server and that corresponds to a TCP connection to the third-party server, the method further includes: receiving, by the edge node, a DNS request message sent by the user equipment; and sending a DNS response message to the user equipment, where the DNS response message carries an IP address of the third-party server.

With reference to any one of the second to the fifth possible implementations of the second aspect, in a seventh possible implementation of the second aspect, when the user equipment is handed over from a first base station cell that includes the edge node to a second base station cell, the method further includes: the central node is further configured to: replicate and encapsulate an uplink TCP packet sent by the user equipment, and forward a replicated and encapsulated uplink TCP packet to the edge node, so that the edge node learns that the user equipment has already been handed over from the first base station cell to the second base station cell; the edge node is further configured to: after decapsulating the replicated and encapsulated uplink TCP packet, perform DNAT on the uplink TCP packet according to the IP address that needs to be steered, and forward a translated uplink TCP packet to the third-party server; and replicate and encapsulate a downlink TCP packet received by the third-party server, and forward a replicated and encapsulated downlink TCP packet to the central node; and the central node is further configured to: after decapsulating the replicated and encapsulated downlink TCP packet, forward a decapsulated downlink TCP packet to the user equipment.

With reference to the sixth possible implementation of the second aspect, in an eighth possible implementation of the second aspect, when the user equipment is handed over from a first base station cell that includes the edge node to a second base station cell, the method further includes: the central node is further configured to: replicate and encapsulate an uplink TCP packet sent by the user equipment, and forward a replicated and encapsulated uplink TCP packet to the edge node, so that the edge node learns that the user equipment has already been handed over from the first base station cell to the second base station cell; the edge node is further configured to: after decapsulating the replicated and encapsulated uplink TCP packet, forward the uplink TCP packet to the third-party server; and after performing source network address translation SNAT on a downlink TCP packet received from the third-party server, replicate and encapsulate a translated downlink TCP packet, and forward a replicated and encapsulated downlink TCP packet to the central node; and the central node is further configured to: after decapsulating the replicated and encapsulated downlink TCP packet, forward a decapsulated downlink TCP packet to the user equipment.

With reference to the seventh or the eighth possible implementation of the second aspect, in a ninth possible implementation of the second aspect, when a first edge node is deployed in the second base station cell, the method further includes: determining, by the first edge node according to whether the uplink TCP packet belongs to a newly established TCP connection, whether the uplink TCP packet is steered to a third-party server corresponding to the second base station cell.

With reference to any one of the first to the ninth possible implementations of the second aspect, in a tenth possible implementation of the second aspect, the method further includes: performing, by the central node, data delivery on the third-party server according to location information of the edge node.

With reference to any one of the first to the tenth possible implementations of the second aspect, in an eleventh possible implementation of the second aspect, the method further includes: reporting, by the edge node, traffic usage of interaction between the third-party server and the user equipment to the central node; and performing, by the central node, charging processing according to the reported traffic usage, so that a charging system performs charging.

With reference to any one of the second aspect or the first to the eleventh possible implementations of the second aspect, in a twelfth possible implementation of the second aspect, the method further includes: obtaining, by the third-party server from the central server, data corresponding to the IP address that needs to be steered.

In the embodiments of the present invention, a cache server or an application server is moved from an IDC equipment room located in a metropolitan area network to a local radio access network or an IP transport network between the radio access network and a wireless core network, and an edge node is deployed to steer a TCP packet for a central server to the cache server or the application server, to implement traffic scheduling. In this way, a transmission delay from the radio access network to a packet core network is reduced, thereby improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
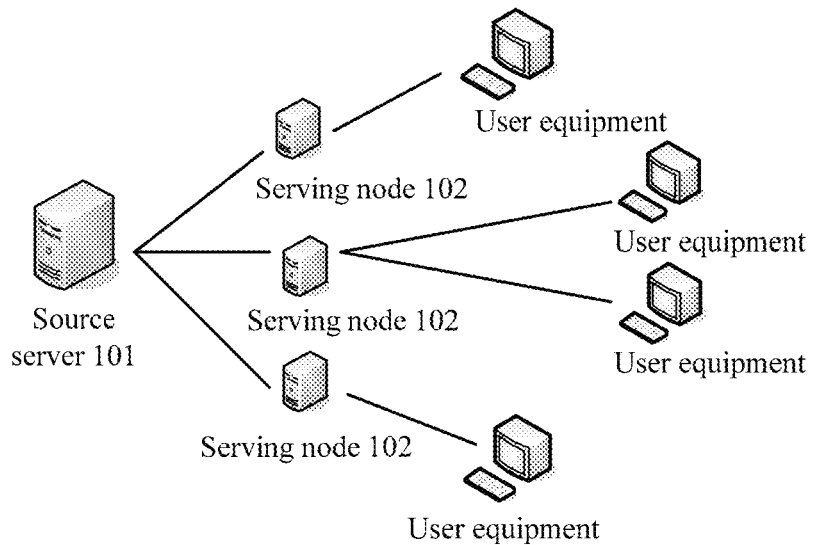
FIG. 1 is a schematic structural diagram of a content delivery network to which the present invention is applicable.

The following clearly and describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM, Global System of Mobile communication) system, a Code Division Multiple Access (CDMA, Code Division Multiple Access) system, a Wideband Code Division Multiple Access (WCDMA, Wideband Code Division Multiple Access) system, a general packet radio service (GPRS, General Packet Radio Service), a Long Term Evolution (LTE, Long Term Evolution) system, an LTE frequency division duplex (FDD, Frequency Division Duplex) system, an LTE time division duplex (TDD, Time Division Duplex) system, Universal Mobile Telecommunications System (UMTS, Universal Mobile Telecommunication System), or a Worldwide Interoperability for Microwave Access (WiMAX, Worldwide Interoperability for Microwave Access) communications system, and the like.

In a radio access network (Radio Access Network, RAN), some or all of fixed-line subscribers access a switch in a wireless manner. The switch accessed by the radio access networks is usually a switch of a public switched telephone network (Public Switched Telephone Network, PSTN), or may be a switch of an integrated services digital network (Integrated Services Digital Network, ISDN). The radio access network is infrastructure on the ground and serves 3G wireless communication, including helping a device moving at high speed access the Internet. A radio access network may be an URTAN (Universal Terrestrial Radio Access Network, universal terrestrial radio access network), a GERAN (GSM EDGE Radio Access Network, GSM/EDGE radio access network), or an E-UTRAN (Evolved Universal Terrestrial Radio Access Network, evolved universal terrestrial radio access network). A mobility management network element may be a mobility management entity (Mobility Management Entity, MME) or a serving GPRS support node (Serving GPRS Support Node, SGSN).

A radio access network may include different network elements in different systems. For example, in LTE and LTE-A, a network element in a radio access network includes an eNB (eNodeB, evolved NodeB); in WCDMA, a network element in a radio access network includes an RNC (Radio Network Controller, radio network controller) and a NodeB; and a network element in a wireless local area network includes an access point (Access Point, AP). Similarly, solutions similar to the embodiments of this application may be applied to another wireless network such as WiMax (Worldwide Interoperability for Microwave Access, Worldwide Interoperability for Microwave Access), but related modules in base station systems may be different. This is not limited in the embodiments of this application.

A wireless core network (Core Network, CN) is used to connect a call request or a data request to different networks. A core network device may be a serving general packet radio service (General Packet Radio Service, GPRS) support node (ServivingGPRS Support Node, SGSN).

FIG. 1 is a schematic structural diagram of a content delivery network to which the present invention is applicable. The content delivery network shown in FIG. 1 includes a source server 101, at least one serving node 102, and at least one user equipment. The source server 101 is a server providing content, and may be a Web server or the like.

The source server 101 delivers content to the at least one serving node 102. Each serving node 102 may serve different user equipment. For example, four user equipments shown in FIG. 1 may be served by three serving nodes 102.

Figure 2:
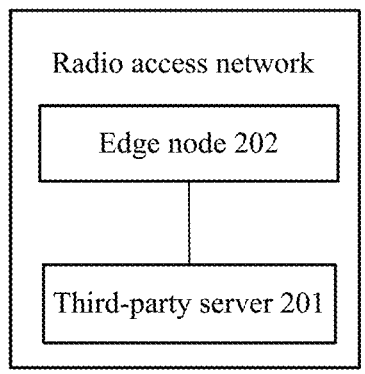
FIG. 2 is a schematic structural diagram of a network system according to an embodiment of the present invention.

FIG. 2 is a schematic structural diagram of a network system according to an embodiment of the present invention. The network system is used for content delivery. The network system in FIG. 2 includes:

a third-party server 201 and an edge node 202 that are located in a radio access network or an Internet Protocol IP transport network between the radio access network and a wireless core network, where the edge node is configured to steer a Transmission Control Protocol TCP packet that is of user equipment for a central server and that corresponds to a TCP connection to the third-party server, and the third-party server includes an application server or a cache server, and is configured to store delivery data of the central server and respond to the TCP packet according to the delivery data.

In this embodiment of the present invention, a cache server or an application server is moved from an IDC equipment room located in a metropolitan area network to a local radio access network or an IP transport network between the radio access network and a wireless core network, and an edge node is deployed to steer a TCP packet for a central server to the cache server or the application server, to implement traffic scheduling. In this way, a transmission delay from the radio access network to a packet core network is reduced, thereby improving user experience.

The central server may be a source server, and the central server is configured to deliver data to a third-party server. The network system may include multiple third-party servers. The third-party server may include a cache server or an application server. The cache server may be a CDN serving node. When the third-party server is a cache server (for example, a CDN serving node), the central node delivers content to the cache server. If the third-party server is an application server, the central node delivers an application to the application server. It should be understood that both content delivery and application delivery may be data delivery.

It should be understood that FIG. 2 shows only parts related to an inventive concept of this embodiment of the present invention, and the network system shown in FIG. 2 may further include user equipment, a packet core network, a central server, and the like. There may be multiple third-party servers shown in FIG. 2. The following describes an entire procedure of the network system in detail. It should be further understood that FIG. 2 shows only the embodiment in which the edge node and the third-party server are located in the radio access network. Alternatively, the edge node and the third-party server may be located in the IP transport network located between the radio access network and the wireless core network.

In an existing CDN solution, a CDN serving node is usually located in a metropolitan area network, and because a radio access network usually does not provide a public IP, a user request cannot be scheduled by using a public IP. Therefore, the CDN serving node cannot be deployed in the radio access network. In this embodiment of the present invention, the CDN serving node is moved to the radio access network or the IP transport network between the radio access network and the wireless core network, and the edge node is deployed to implement a steering mechanism.

A software program may be used to implement a function of the edge node to fulfill a function such as the steering mechanism. It should be understood that a steering process may be referred to as local breakout (Local Breakout) in a protocol, and a process of local breakout is uniformly written as steering in the embodiments of the present invention. FIG. 2 shows a scenario in which the edge node and the third-party server are located in the radio access network. It should be understood that the edge node and the third-party server may be alternatively located in the IP transport network between the radio access network and the wireless core network. As shown in FIG. 2, multiple third-party servers may be deployed in the radio access network. It should be understood that the present invention describes only one third-party server in the multiple third-party servers.

The edge node may also be referred to as a mobile content delivery network edge node (Mobile Content Delivery Network edge, MCDN-edge).

It should be understood that the network system may steer traffic to a locally deployed third-party server by means of DNAT, or may steer traffic to a locally deployed third-party server by means of DNS hijacking.

Optionally, in another embodiment, steering traffic to the locally deployed third-party server by means of DNAT includes: determining and storing, by the edge node 202, an IP address that needs to be steered; and performing destination network address translation DNAT on a TCP packet according to the IP address that needs to be steered, so as to steer the TCP packet to the third-party server.

Specifically, for example, if user equipment wants to visit Baidu.com, a domain name needs to be sent, and a DNS server parses the domain name to obtain a destination IP address corresponding to the domain name. The destination IP address is the IP address that needs to be steered in this embodiment of the present invention. It should be understood that data corresponding to the destination IP address may be placed in the third-party server in advance, or the third-party server may provide an application service. The edge node in this embodiment of the present invention performs destination IP address translation on an uplink TCP packet sent by the user equipment, so that the TCP packet is translated from an IP address originally steered to the central server into an IP address steered to the third-party server, and the third-party server serves the user equipment.

Optionally, in an embodiment, the edge node may determine, by parsing a DNS response message, the IP address that needs to be steered.

Specifically, in a process in which the edge node 202 may determine the IP address that needs to be steered, the edge node 202 may parse a domain name system DNS response message corresponding to a DNS request message sent by the user equipment, to obtain the IP address that needs to be steered.

Optionally, in another embodiment, the edge node 202 may obtain, from a network management system, the IP address that needs to be steered.

The third-party server may be referred to as an APP-Edge, and the edge node may be referred to as an MCDN-Edge. A process in which the edge node obtains the IP address by parsing the DNS response message corresponding to the DNS request message may be as follows:

(1) The UE initiates the DNS request message.

It should be understood that a private IP used by the third-party server to locally provide a service, and a domain name and a public IP that are processed by the third-party server (APP-Edge) are preconfigured on the edge node.

It should be further understood that in a process in which the UE initiates the DNS request message, the UE sends a DNS request for the domain name to a DNS server (DNS Server) by using the edge node; and the DNS Server returns a corresponding DNS response message (DNS Response) to the UE by using the edge node.

(2) The edge node parses the DNS response message and stores the IP address that needs to be steered.

Optionally, in another embodiment, the edge node 202 may steer traffic to the locally deployed third-party server by means of DNS hijacking.

Specifically, the edge node 202 may receive a DNS request message sent by the user equipment for a domain name processed by the third-party server (APP-Edge), and send a DNS response message to the user equipment. The DNS response message carries an IP address of the third-party server.

A process in which the edge node obtains the IP address by hijacking the DNS request message may be as follows:

(1) The UE sends the DNS request for the domain name to the DNS server.

(2) The MCDN-Edge hijacks the DNS request and constructs a DNS response, and the DNS response includes the IP address of the APP-Edge.

It should be understood that a domain name that needs to be steered and a third-party server private IP corresponding to the domain name are preconfigured on the edge node (MCDN-Edge). When the UE initiates the DNS request message, the MCDN-Edge intercepts the DNS request message, directly constructs the DNS response message, and returns the third-party server private IP corresponding to the domain name.

(3) The DNS response is sent to the UE.

It should be understood that after the UE caches a DNS result, to avoid a service access failure caused because the UE is handed over to a base station for which no edge node/third-party server is deployed, a time to live (Time To Live, TTL) of the DNS needs to be set to a relatively small value, for example, may be set to 1 second.

Figure 3:
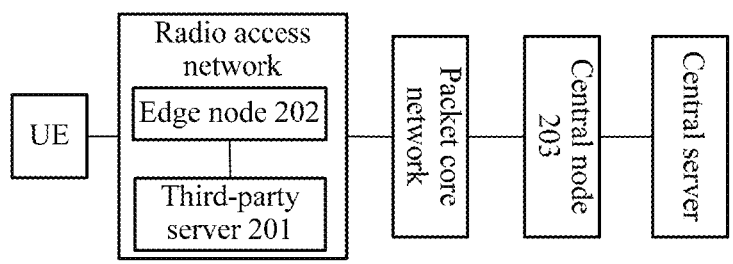
FIG. 3 is a schematic structural diagram of a network system according to another embodiment of the present invention.

FIG. 3 is a schematic structural diagram of a network system according to another embodiment of the present invention. A same number may be used for an apparatus in FIG. 3 that is the same as that in FIG. 2, and the network system shown in FIG. 3 further includes:

a central node 203 located in a wireless core network, where an edge node 202 may further register a TCP connection with the central node, so that the central node 203 learns that a third-party server 201 has already served user equipment at the edge node.

In this embodiment of the present invention, a cache server or an application server is moved from an IDC equipment room located in a metropolitan area network to a local radio access network or an IP transport network between the radio access network and a wireless core network, and an edge node is deployed to steer a TCP packet for a central server to the cache server or the application server, to implement traffic scheduling. In this way, a transmission delay from the radio access network to a packet core network is reduced, thereby improving user experience.

In addition, the central node is deployed in the wireless core network, and the edge node and the central node can cooperate to resolve a mobility problem caused by a base station handover of the user equipment, so as to ensure continuity and integrity of a user service. In addition, functions such as data retrieval, data delivery, and charging can be implemented. In this way, the third-party server does not need to be modified or moved, thereby reducing an overall transmission delay of user service access and improving user experience.

It should be understood that FIG. 3 further includes user equipment UE, a packet core network, and a server device. The server device includes a central server.

It should be further understood that the central node may be an mobile content delivery network central node (MCDN-Core) and is a system convergence node. The MCDN-Core may be deployed on a Gi/SGi interface on a gateway GPRS support node (Gateway GPRS Support Node, GGSN) and packet data network gateway (Packet Data Network Gateway, PGW) side, and is responsible for mobility management, charging, communication proxy, and the like when the UE performs a base station handover.

Specifically, a radio access network and the edge node (MCDN-Edge) may use a GTP-U message of the GPRS tunneling protocol (General Packet Radio Service Tunneling Protocol, GTP) for communication, the edge node and the third-party server (APP-Edge) may use an IP message for communication, and the edge node and the central node (MCDN-Core) may use out-of-band communication. Out-of-band (Out of band) communication means data transmission by using totally different channels. For example, a protocol usually does not use a same channel as that of common data, but uses another channel to transmit important data. Specifically, the third-party server deployed on the edge node uses an out-of-band channel to exchange information with the central server.

Optionally, in another embodiment, if the third-party server does not include data corresponding to an IP address that needs to be steered, the third-party server may obtain, from the central server, the data corresponding to the IP address that needs to be steered.

Specifically, the third-party server may exchange information with the central server by using an out-of-band channel provided by the central node, so as to obtain, from the central server, the data corresponding to the IP address that needs to be steered.

In this embodiment of the present invention, the third-party server does not have a public IP, and cannot directly communicate with the central server in an external network. The third-party server sets the central node as a protocol for sessions traversal across firewall securely (Protocol for sessions traversal across firewall securely, SOCKS) proxy or a Hypertext Transfer Protocol/Hypertext Transport Protocol Server (Hypertext Transfer Protocol/Hypertext Transport Protocol Secure, HTTP/HTTPS) proxy, and exchanges information with the central server by using the out-of-band channel, thereby implementing data retrieval.

Optionally, in another embodiment, in a traffic steering process, the edge node may forward a message between the user equipment and the third-party server. The message may be a TCP packet corresponding to the TCP connection.

Figure 4A:
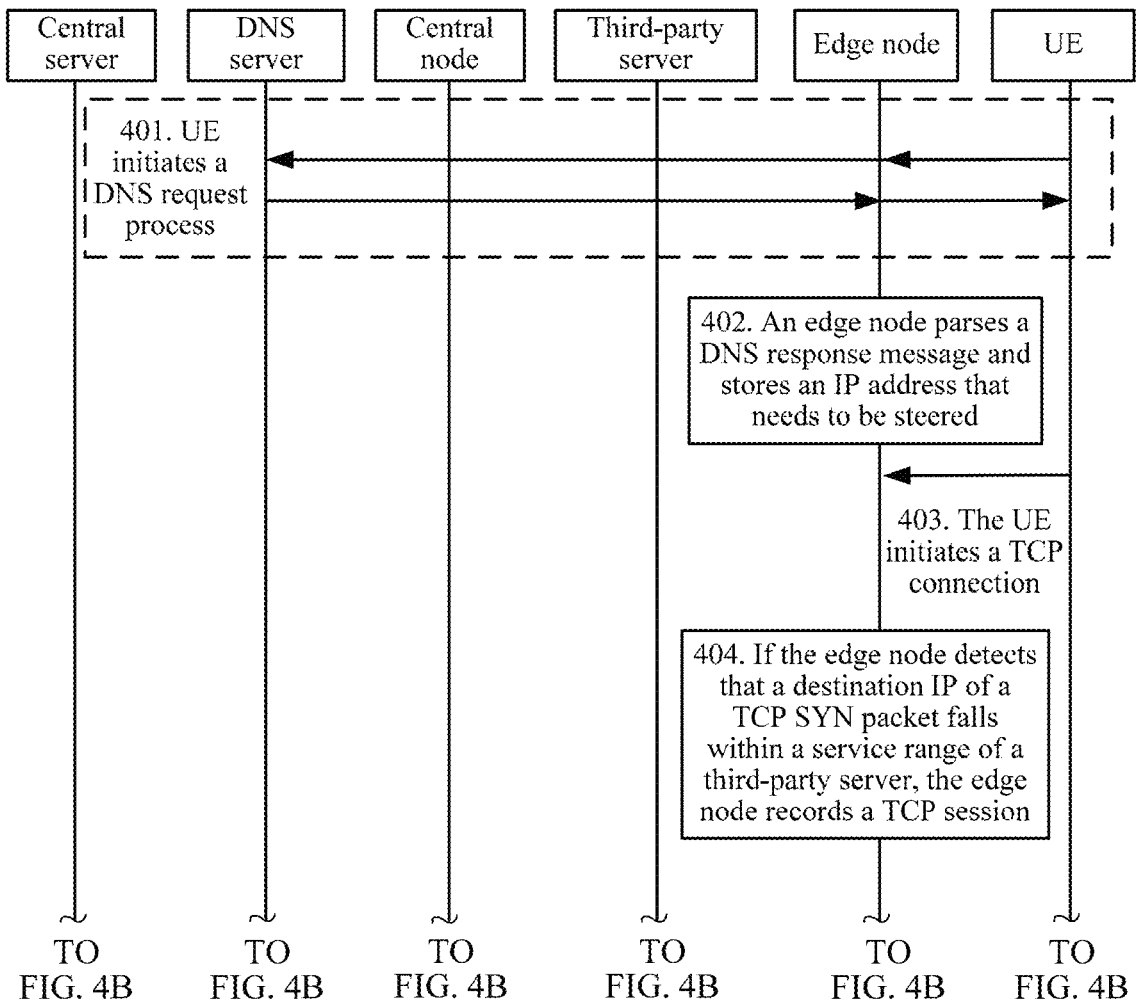
FIG. 4A and FIG. 4B are a schematic flowchart of a traffic steering process according to an embodiment of the present invention.
Figure 4B:
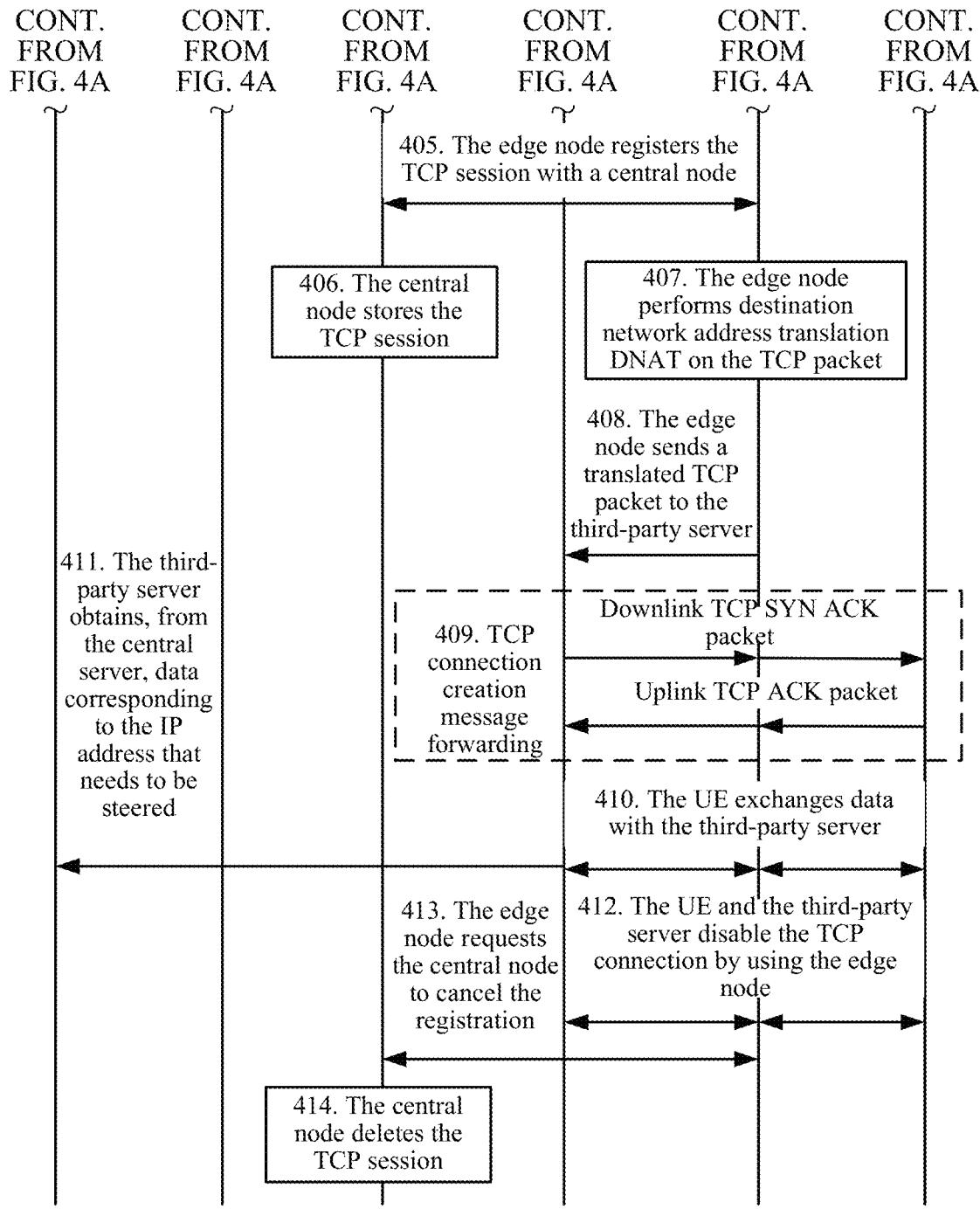

With reference to FIG. 4A and FIG. 4B, the following describes in detail a process of obtaining, by parsing a DNS request message, an IP address that needs to be steered and performing traffic steering. FIG. 4A and FIG. 4B are a schematic flowchart of a traffic steering process according to an embodiment of the present invention. A third-party server may be referred to as an APP-Edge, an edge node may be referred to as an MCDN-Edge, and a central node may be referred to as an MCDN-Core. The process shown in FIG. 4A and FIG. 4B includes the following steps.

401. UE initiates a DNS request process.

It should be understood that a private IP used by the third-party server to locally provide a service, and a domain name and a public IP that are processed by the APP-Edge are preconfigured on the edge node.

Specifically, in step 401, that UE initiates a DNS request process includes the following: The UE sends a DNS request message (DNS Request) to a DNS server (DNS Server) by using the edge node. The DNS server returns a DNS response message (DNS Response) by using the edge node.

402. The edge node parses the DNS response message and stores an IP address that needs to be steered.

403. The UE initiates a TCP connection.

Specifically, the UE may initiate the TCP connection by sending an uplink TCP SYN packet to the edge node.

404. If the edge node detects that a destination IP of a TCP SYN packet falls within a service range of the third-party server, the edge node records the TCP session.

405. The edge node registers the TCP session with the central node.

Specifically, the MCDN-Edge registers an IP 5-tuple (source IP/source port/destination IP/destination port/TCP protocol) of the TCP session with the MCDN-Core by using an out-of-band channel.

Alternatively, in another embodiment, the registration process may be implemented by using an in-band channel. The MCDN-Edge replicates and forwards the UE uplink TCP SYN packet of the TCP session to a wireless core network, and adds two pieces of identification information to a TCP header field (such as an option field). These two pieces of identification information include edge node identification information and a local process.

The edge node identification information (MCDN-Edge ID) is used to identify a number of the current MCDN-Edge. The MCDN-Core may learn, according to the number, of the MCDN-Edge to which the current session belongs. If the UE subsequently performs a cell handover, the MCDN-Core may interact with the MCDN-Edge for multiple times by using an out-of-band channel, to implement mobility management.

The local process (Local Process) is used to identify that the TCP connection has already been offloaded by the MCDN-Edge to the APP-Edge for processing. After identification, the MCDN-Core does not forward the TCP packet to a central server.

406. The central node stores the TCP session.

Specifically, the MCDN-Core learns that the TCP session has already been served at the MCDN-Edge.

407. The edge node performs destination network address translation DNAT on the TCP packet.

408. The edge node sends a translated TCP packet to the third-party server.

It should be understood that the TCP packet is the uplink TCP SYN packet sent by the UE, and the edge node performs translation on the TCP packet. The destination IP of the TCP packet is the IP address that needs to be steered, and the edge node translates the IP address that needs to be steered into an IP address of the third-party server. In this case, the UE actually requests a service from the third-party server. Because data has already been delivered to the third-party server, the third-party server can directly serve the UE.

409. TCP connection creation message forwarding.

Specifically, the UE and the third-party server perform TCP connection creation message forwarding by using the edge node. After the MCDN-Edge sends a translated uplink TCP SYN packet to the APP-Edge, the third-party server sends a downlink TCP SYN ACK packet to the MCDN-Edge. The MCDN-Edge forwards the downlink TCP SYN ACK packet to the UE. The UE sends an uplink TCP ACK packet to the MCDN-Edge. The MCDN-Edge forwards the uplink TCP ACK packet to the APP-Edge.

410. The UE exchanges data with the third-party server.

Specifically, the UE exchanges data with the third-party server by using the edge node.

411. The third-party server obtains, from a central server, data corresponding to the IP address that needs to be steered.

Optionally, if the third-party server does not locally have the data corresponding to the IP address that needs to be steered, the third-party server may exchange information with the central server by using the out-of-band channel provided by the central node, so as to obtain the corresponding data.

412. The UE and the third-party server disable the TCP connection by using the edge node.

413. The edge node requests the central node to cancel the registration.

414. The central node deletes the TCP session.

Figure 5A:
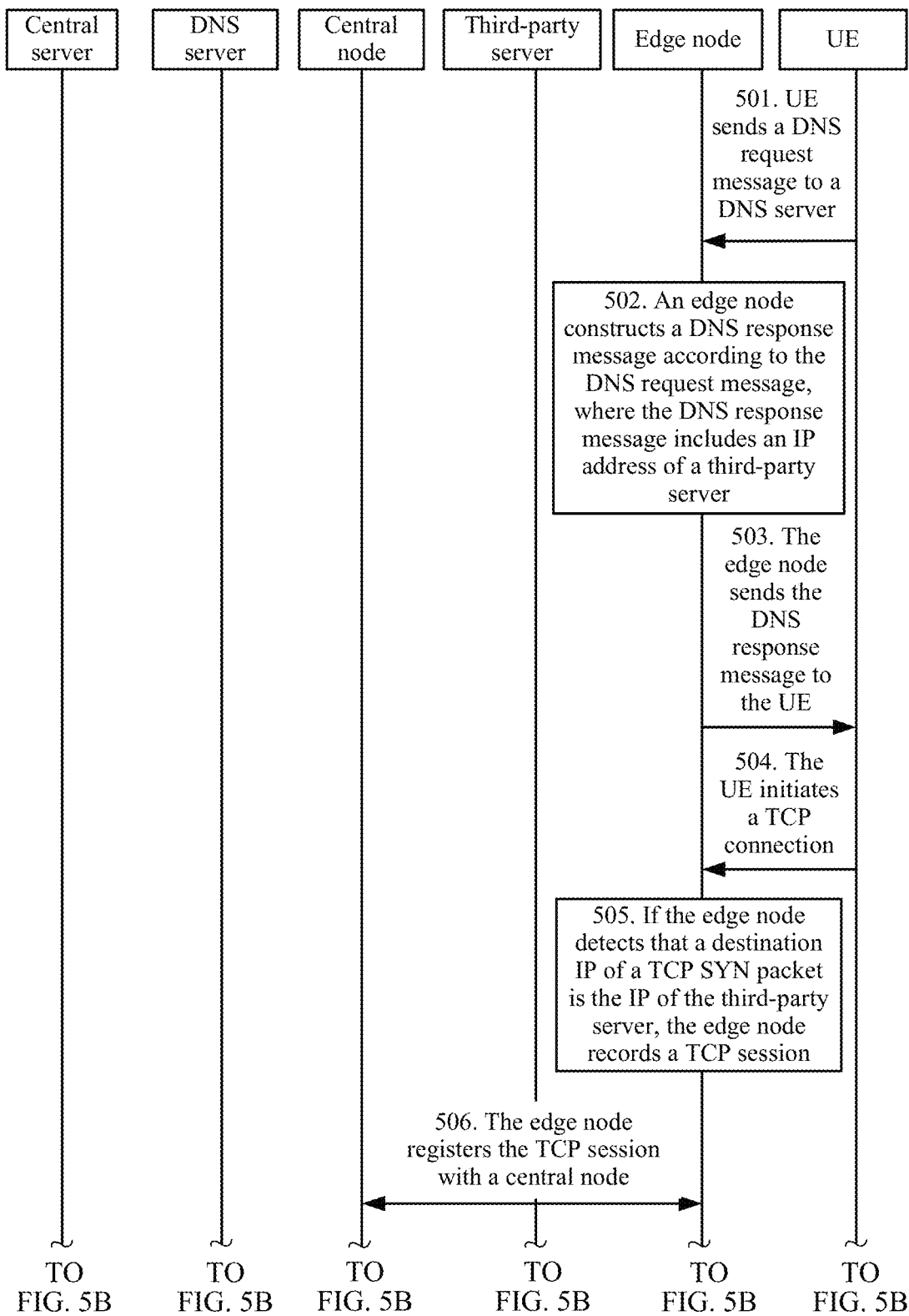
FIG. 5A and FIG. 5B are a schematic flowchart of a traffic steering process according to another embodiment of the present invention.
Figure 5B:
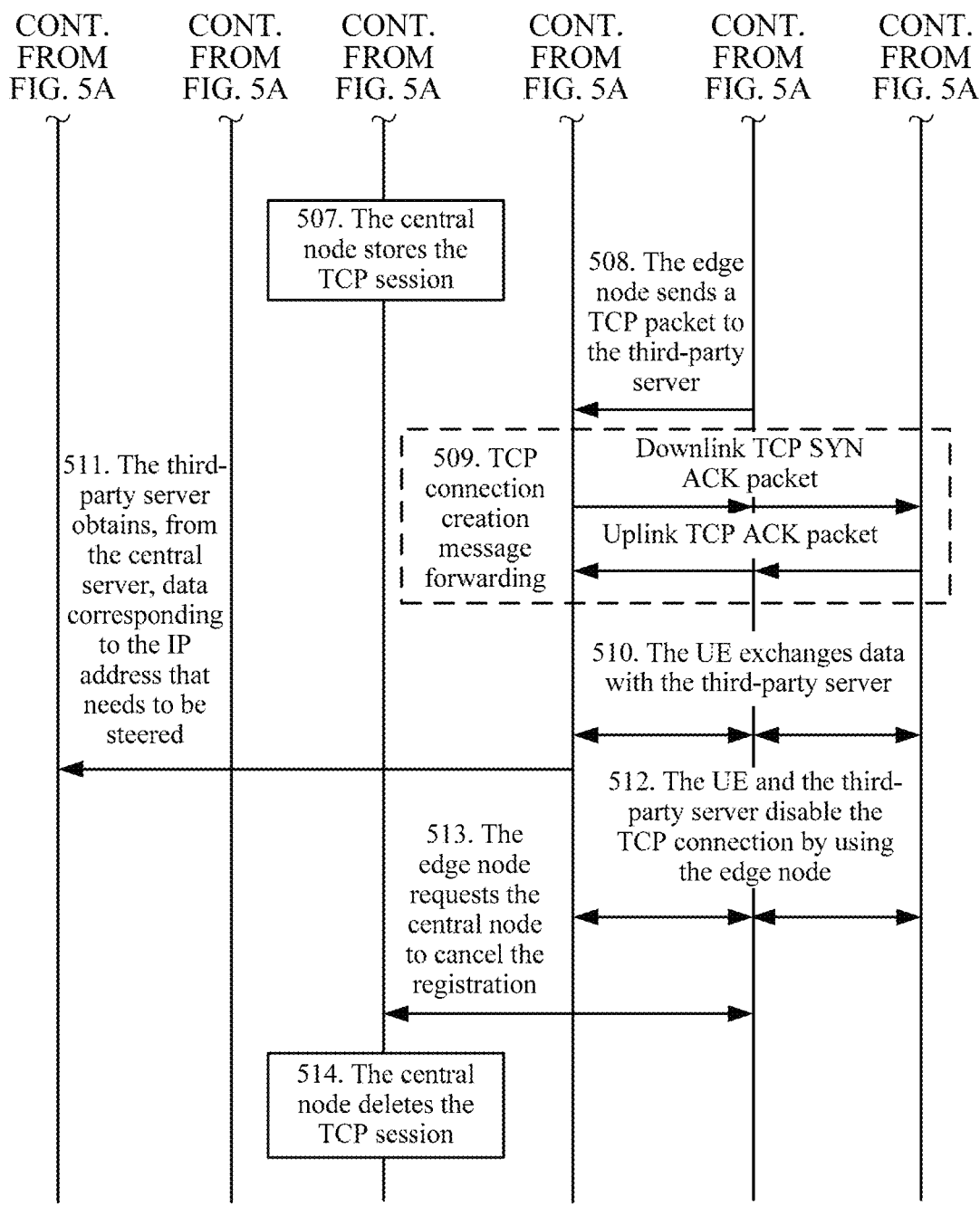

With reference to FIG. 5A and FIG. 5B, the following describes in detail a process of obtaining, by means of DNS hijacking, an IP address that needs to be steered and performing traffic steering. FIG. 5A and FIG. 5B are a schematic flowchart of a traffic steering process according to another embodiment of the present invention. A third-party server may be an APP-Edge, an edge node may be an MCDN-Edge, and a central node may be an MCDN-Core. The process shown in FIG. 5A and FIG. 5B includes the following steps.

501. UE sends a DNS request message to a DNS server.

It should be understood that a domain name that needs to be steered and a private IP that is of the third-party server and that corresponds to the domain name are preconfigured on the edge node. Specifically, after the UE sends the DNS request message to the DNS server, the edge node hijacks the DNS request message.

502. The edge node constructs a DNS response message according to the DNS request message, where the DNS response message includes an IP address of the third-party server.

503. The edge node sends the DNS response message to the UE.

Specifically, if the MCDN-Edge detects that the domain name of the DNS request is a service domain name of the APP-Edge, the MCDN-Edge constructs the DNS response message and returns the private IP that is of the third-party server and that corresponds to the domain name.

504. The UE initiates a TCP connection.

Specifically, the UE may initiate the TCP connection by sending an uplink TCP SYN packet to the edge node.

505. If the edge node detects that a destination IP of a TCP SYN packet is the IP of the third-party server, the edge node records the TCP session.

506. The edge node registers the TCP session with the central node.

Specifically, the MCDN-Edge registers an IP 5-tuple (source IP/source port/destination IP/destination port/TCP protocol) of the TCP session with the MCDN-Core by using an out-of-band channel.

Alternatively, in another embodiment, the registration process may be implemented by using an in-band channel. The MCDN-Edge replicates and forwards the UE uplink TCP SYN packet of the TCP session to a wireless core network, and adds two pieces of identification information to a TCP header field (such as an option field). These two pieces of identification information include edge node identification information and a local process.

The edge node identification information (MCDN-Edge ID) is used to identify a number of the current MCDN-Edge. The MCDN-Core may learn, according to the number, of the MCDN-Edge to which the current session belongs. If the UE subsequently performs a cell handover, the MCDN-Core may interact with the MCDN-Edge for multiple times by using an out-of-band channel, to implement mobility management.

The local process (Local Process) is used to identify that the TCP connection has already been offloaded by the MCDN-Edge to the APP-Edge for processing. After identification, the MCDN-Core does not forward the TCP packet to a central server.

507. The central node stores the TCP session.

Specifically, the MCDN-Core learns that the TCP session has already been served at the MCDN-Edge.

508. The edge node sends a TCP packet to the third-party server.

509. The UE and the third-party server perform TCP connection creation message forwarding by using the edge node.

Specifically, the MCDN-Edge sends a translated uplink TCP SYN packet to the APP-Edge. The third-party server sends a downlink TCP SYN ACK packet to the MCDN-Edge. The MCDN-Edge forwards the downlink TCP SYN ACK packet to the UE. The UE sends an uplink TCP ACK packet to the MCDN-Edge. The MCDN-Edge forwards the uplink TCP ACK packet to the APP-Edge.

510. The UE exchanges data with the third-party server by using the edge node.

511. The third-party server obtains, from a central server, data corresponding to the IP address that needs to be steered.

Optionally, if the third-party server does not locally have the data corresponding to the IP address that needs to be steered, the third-party server may exchange information with the central server by using the out-of-band channel provided by the central node, so as to obtain the corresponding data.

512. The UE and the third-party server disable the TCP connection by using the edge node.

513. The edge node requests the central node to cancel the registration.

514. The central node deletes the TCP session.

Figure 6A:
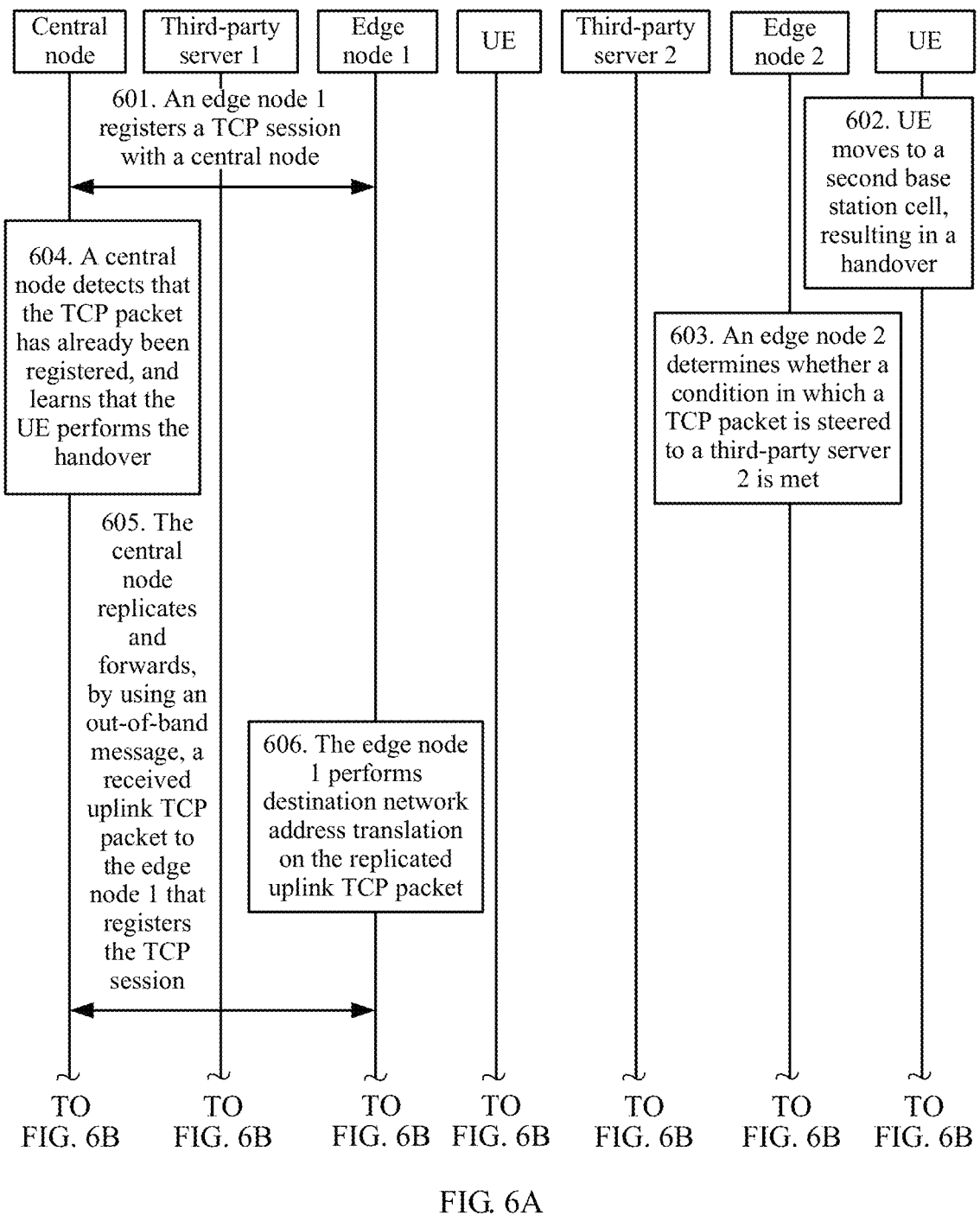
FIG. 6A and FIG. 6B are a schematic flowchart of a process in which user equipment performs a base station cell handover according to an embodiment of the present invention.
Figure 6B:
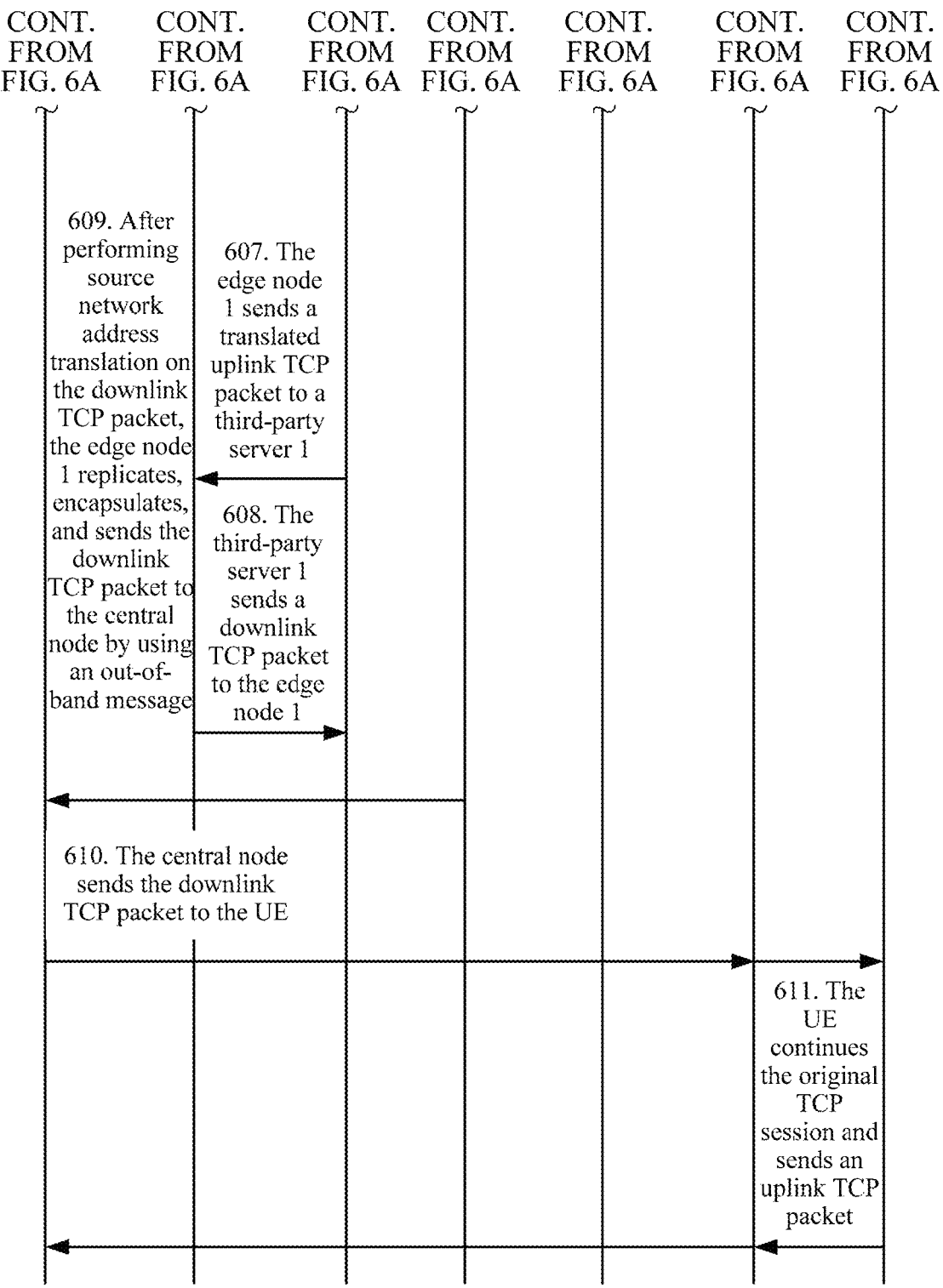

FIG. 6A and FIG. 6B are a schematic flowchart of a process in which user equipment performs a base station cell handover according to an embodiment of the present invention.

It should be understood that after the user equipment is handed over to another base station cell, an edge node may be or may not be configured for the cell. A process of steering traffic to a locally deployed third-party server may be implemented by parsing a DNS response message, or may be implemented by hijacking a DNS request message. A cell handover process may vary in the two embodiments.

Optionally, in another embodiment, if traffic is steered to the locally deployed third-party server by parsing the DNS response message, a central node may further replicate and encapsulate an uplink TCP packet sent by the user equipment, and forward a replicated and encapsulated uplink TCP packet to the edge node, so that the edge node learns that the user equipment has already been handed over from a first base station cell to a second base station cell. After decapsulating the replicated and encapsulated uplink TCP packet, the edge node may further perform DNAT on the uplink TCP packet according to an IP address that needs to be steered, and forward a translated uplink TCP packet to the third-party server. After performing source network address translation SNAT on a downlink TCP packet received from the third-party server, the edge node replicates and encapsulates a downlink TCP packet received from the third-party server, and forwards a replicated and encapsulated downlink TCP packet to the central node. After decapsulating the replicated and encapsulated downlink TCP packet, the central node may further forward a decapsulated downlink TCP packet to the user equipment.

Optionally, in another embodiment, if traffic is steered to the locally deployed third-party server by hijacking the DNS request message, a central node may further replicate and encapsulate an uplink TCP packet sent by the user equipment, and forward a replicated and encapsulated uplink TCP packet to the edge node, so that the edge node learns that the user equipment has already been handed over from a first base station cell to a second base station cell. After decapsulating the replicated and encapsulated uplink TCP packet, the edge node may further forward the uplink TCP packet to the third-party server. The edge node replicates and encapsulates a downlink TCP packet received from the third-party server, and forwards a replicated and encapsulated downlink TCP packet to the central node. After decapsulating the replicated and encapsulated downlink TCP packet, the central node may further forward a decapsulated downlink TCP packet to the user equipment.

Optionally, in another embodiment, when a first edge node is deployed in the second base station cell, the first edge node determines, according to whether an uplink TCP packet belongs to a newly established TCP connection, whether the uplink TCP packet is steered to a third-party server corresponding to the second base station cell.

FIG. 6A and FIG. 6B show a situation in which when the user equipment performs the base station cell handover, a base station cell after the handover includes an edge node. The third-party server may be referred to as an APP-Edge, and the third-party server includes a third-party server 1 (APP-Edge 1) and a third-party server 2 (APP-Edge 2). The edge node may be an MCDN-Edge, and the edge node includes an edge node 1 (MCDN-Edge 1) and an edge node 2 (MCDN-Edge 2). The central node may be an MCDN- Core. The third-party server 1 and the edge node 1 may be deployed in a radio access network of the first base station cell or an IP transport network between the radio access network and a wireless core network, and the third-party server 2 and the edge node server 2 may be deployed in a radio access network of the second base station cell or an IP transport network between the radio access network and a wireless core network.

The process shown in FIG. 6A and FIG. 6B includes the following steps.

601. The edge node 1 registers a TCP session with the central node.

It should be understood that before the handover, the UE is served by the third-party server 1 of the first base station cell.

602. The UE moves to the second base station cell, resulting in a handover.

Specifically, an uplink TCP packet of the UE passes the MCDN-Edge 2 to which the cell after the handover belongs.

603. The edge node 2 determines whether a condition in which a TCP packet is steered to the third-party server 2 is met.

Specifically, the determining condition is as follows:

a. an IP that needs to be steered is an IP served by the APP-Edge 2, and is TCP SYN (indicating that a new TCP session is to be established); or b. an IP that needs to be steered is an IP served by the APP-Edge 2, and is an uplink TCP packet other than TCP SYN, and the MCDN-Edge 2 has already recorded the session information.

604. The central node detects that the TCP packet has already been registered, and learns that the UE performs the handover.

Specifically, the MCDN-Core receives an uplink TCP packet of the previously registered TCP session. If no cell handover occurs, the MCDN-Core is not to receive the TCP packet. Therefore, after receiving the uplink TCP packet, it may be learned that the UE has already performed the cell handover.

605. The central node replicates and forwards, by using an out-of-band message, a received uplink TCP packet to the edge node 1 that registers the TCP session.

The edge node 1 (MCDN-Edge 1) perceives that the UE performs the cell handover.

606. The edge node 1 performs destination network address translation on the replicated uplink TCP packet.

It should be understood that the method shown in FIG. 6A and FIG. 6B corresponds to the embodiment in which steering is performed by parsing a DNS response message. If steering is performed by hijacking a DNS request message, the destination network address translation process in step 606 is not required, but instead the TCP packet is directly sent to the third-party server 1 in step 607.

607. The edge node 1 sends a translated uplink TCP packet to the third-party server 1.

608. The third-party server 1 sends a downlink TCP packet to the edge node 1.

Specifically, the edge node 1 receives the downlink TCP packet, and learns that the UE performs the cell handover.

609. After performing source network address translation on the downlink TCP packet, the edge node 1 replicates, encapsulates, and sends the downlink TCP packet to the central node by using an out-of-band message.

610. The central node sends the downlink TCP packet to the UE.

Specifically, the central node may send the downlink TCP packet to the edge node 2, and the edge node 2 forwards the downlink TCP packet to the UE.

611. The UE continues the original TCP session and sends an uplink TCP packet.

Specifically, the UE may send the uplink TCP packet to the edge node 2, and the edge node 2 forwards the uplink TCP packet to the central node.

Afterward, steps 604 to 611 may be repeated in this embodiment of the present invention.

It should be understood that the edge node 2 in the process in FIG. 6A and FIG. 6B is the first edge node of the second cell in which the UE is located after the handover. FIG. 6A and FIG. 6B describes the situation in which the second base station cell after the handover includes the edge node 2. If the second base station cell after the handover does not include the edge node 2, all steps of this process are the same as those of the process shown in FIG. 6A and FIG. 6B, except that the process does not include step 603. To avoid repetition, details are not described herein again.

Figure 7A:
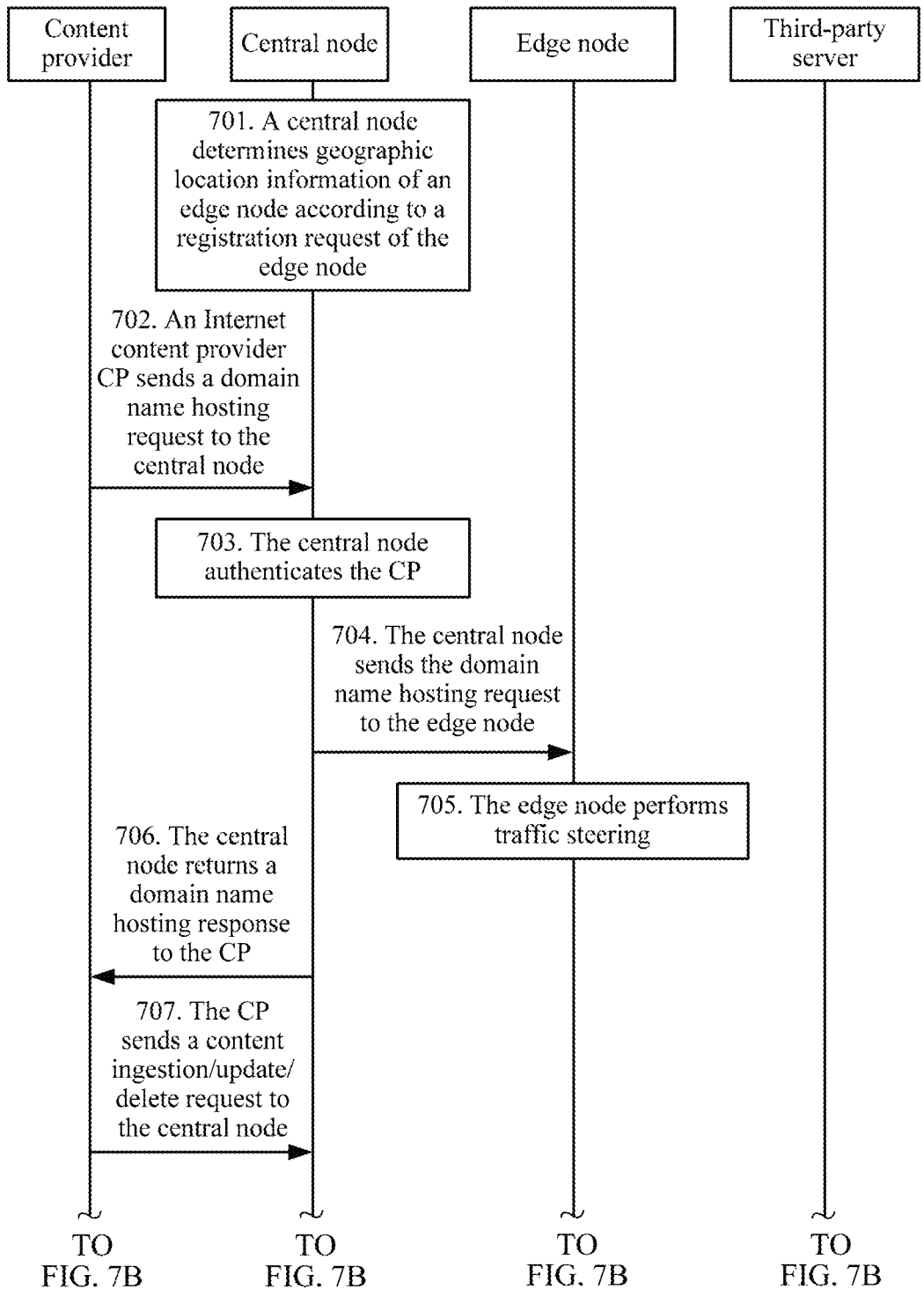
FIG. 7A and FIG. 7B are a schematic flowchart of a data delivery process according to an embodiment of the present invention.
Figure 7B:
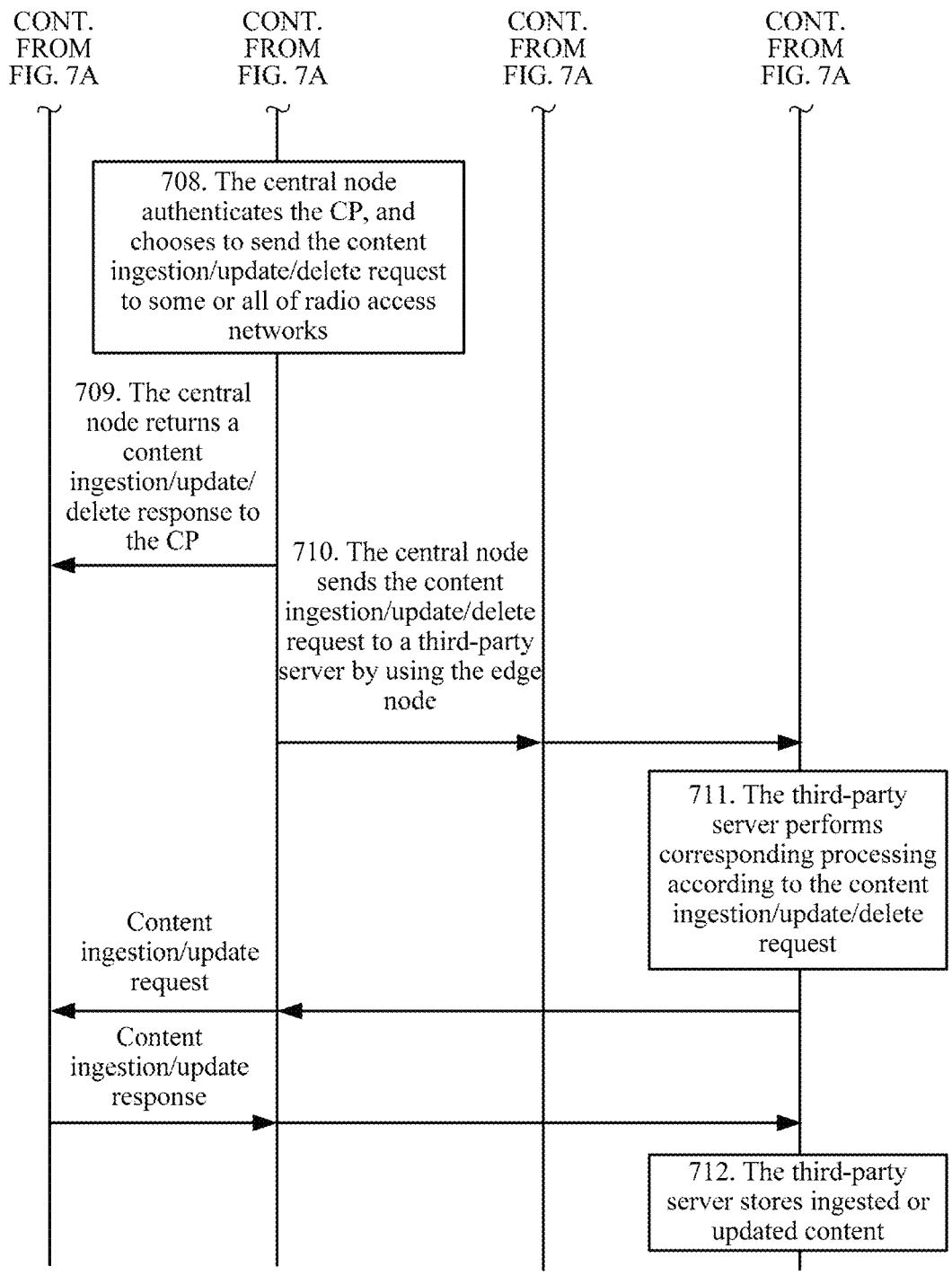

FIG. 7A and FIG. 7B are a schematic flowchart of a data delivery process according to an embodiment of the present invention.

Optionally, in another embodiment, a central node may perform data delivery for a third-party server according to location information of an edge node.

Specifically, when a central server (APP-HQ) in a public network needs to proactively deliver content to a third-party server (APP-Edge) of an internal network, all content is delivered by the central node (MCDN-Core).

The edge node (MCDN-Edge) registers with the central node (MCDN-Core), and the MCDN-Core may learn of information such as a number, a geographic location, and cell classification of the accessed MCDN-Edge. A province, a city, a district or county, and a cell type (such as a school, an airport, a shopping center, or the like) corresponding to a service area of the MCDN-Edge may be set according to the geographic location.

It should be understood that the third-party server may be an APP-Edge, the edge node may be an MCDN-Edge, and the central node may be an MCDN-Core. The process shown in FIG. 7A and FIG. 7B includes the following steps.

701. The central node determines geographic location information of the edge node according to a registration request of the edge node.

Specifically, the central node determines the address location information, and then may set a province, a city, a district or county, a cell type, and the like corresponding to the edge node according to the geographic location information.

702. An Internet content provider CP sends a domain name hosting request to the central node.

Specifically, when sending the domain name hosting request, the CP may select a target city, a target cell type, or the like.

703. The central node authenticates the CP.

Specifically, the central node selects a target edge node according to the request (for example, the target city and/or the target cell type) of the CP, and selectively sends the domain name hosting request to the corresponding edge node.

704. The central node sends the domain name hosting request to the edge node.

705. The edge node performs traffic steering.

706. The central node returns a domain name hosting response to the CP.

707. The CP sends a content ingestion/update/delete request to the central node.

708. The central node authenticates the CP, and chooses to send the content ingestion/update/delete request to some or all of radio access networks.

709. The central node returns a content ingestion/update/delete response to the CP.

710. The central node sends the content ingestion/update/delete request to the third-party server by using the edge node.

711. The third-party server performs corresponding processing according to the content ingestion/update/delete request.

Specifically, the third-party server (APP-Edge) receives the content ingestion/update/delete request. If the third-party server receives the content delete request, the third-party server deletes the local URL content; or if the third-party server receives the content ingestion/update request, the third-party server initiates a content obtaining request to a source station by using a SOCKS or HTTP/HTTPS proxy server provided by the MCDN-Core.

The third-party server sends the content ingestion/update request to the CP by using the central node, and the CP sends a content ingestion/update response to the third-party server by using the central node.

712. The third-party server stores ingested or updated content.

Figure 8A:
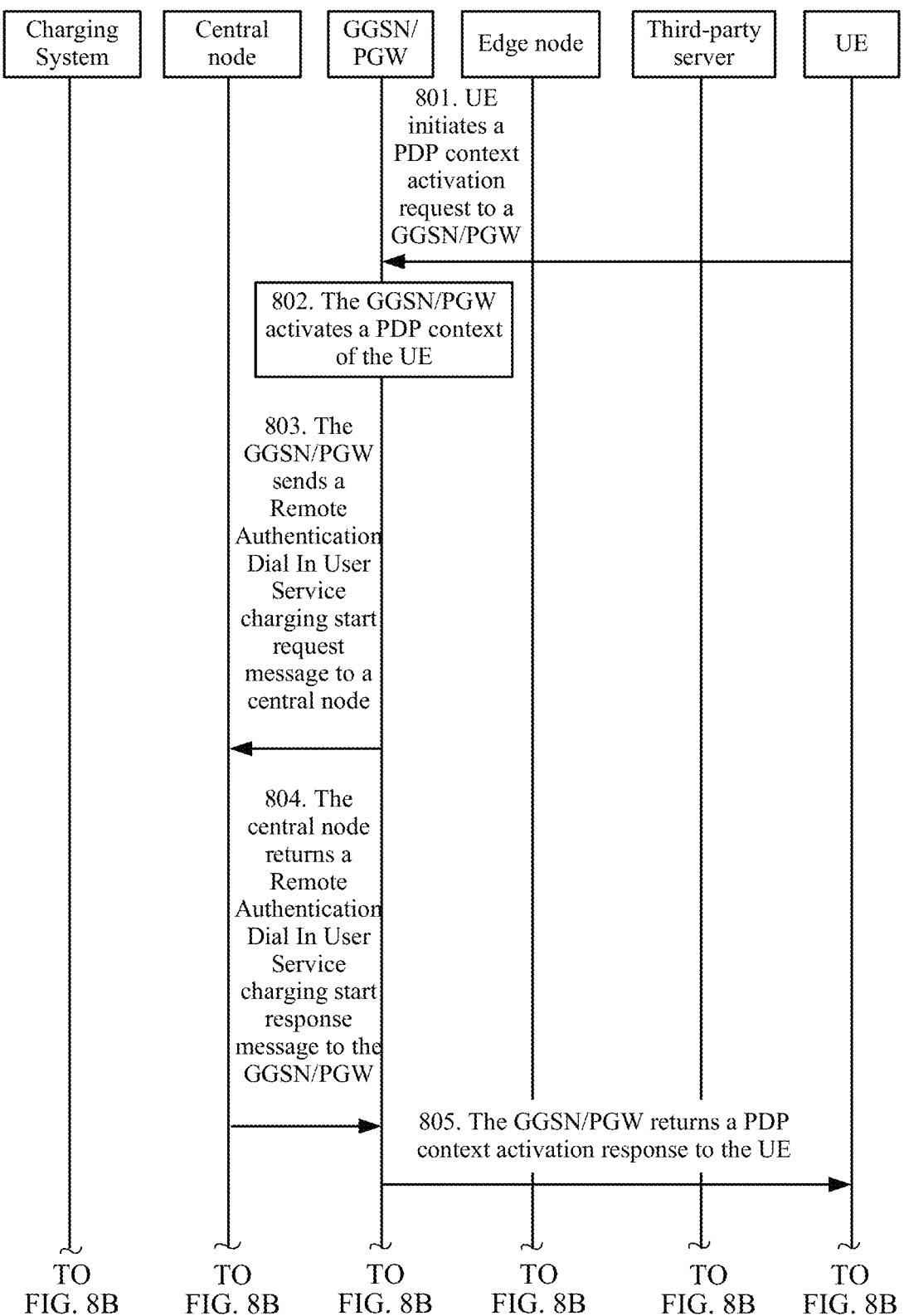
FIG. 8A and FIG. 8B are a schematic flowchart of a charging processing process according to an embodiment of the present invention.
Figure 8B:
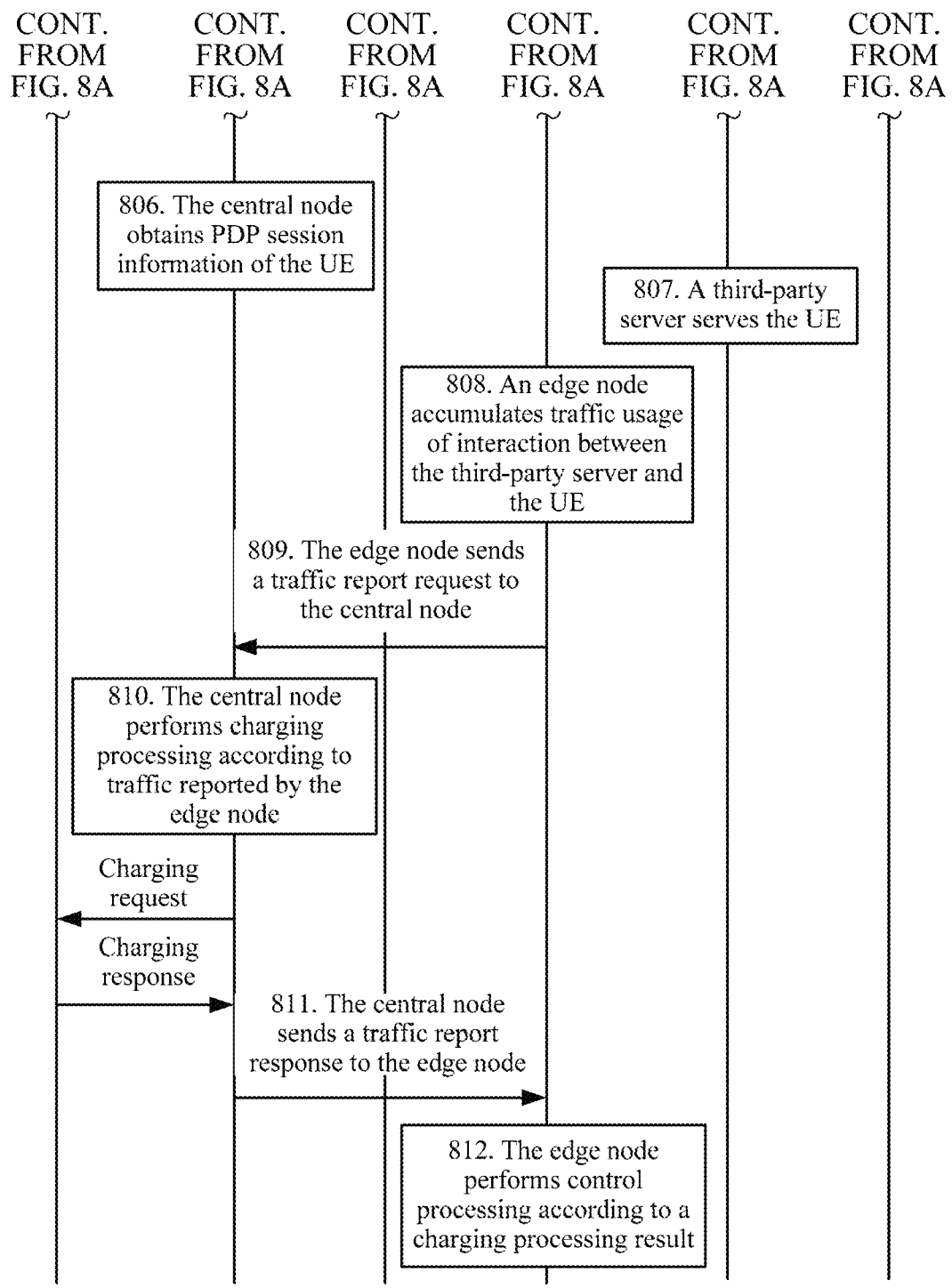

FIG. 8A and FIG. 8B are a schematic flowchart of a charging processing process according to an embodiment of the present invention.

Optionally, in another embodiment, an edge node may report traffic usage of interaction between a third-party server and user equipment to a central node. The central node may perform charging processing according to the reported traffic usage, so that a charging system performs charging.

It should be understood that the third-party server may be an APP-Edge, the edge node may be an MCDN-Edge, and the central node may be an MCDN-Core. The process shown in FIG. 8A and FIG. 8B is a process of charging the UE. The process shown in FIG. 8A and FIG. 8B includes the following steps.

801. The UE initiates a PDP context activation request to a GGSN/PGW.

802. The GGSN/PGW activates a PDP context of the UE.

803. The GGSN/PGW sends a Remote Authentication Dial In User Service charging start request message to the central node.

804. The central node returns a Remote Authentication Dial In User Service charging start response message to the GGSN/PGW.

805. The GGSN/PGW returns a PDP context activation response to the UE.

806. The central node obtains PDP session information of the UE.

The central node may obtain the PDP session information of the UE from the Remote Authentication Dial In User Service charging start response message. Specifically, the PDP session information includes a UE IP, a mobile phone number (MSISDN), an APN, a bearer type, and the like.

807. The third-party server serves the UE.

Specifically, the edge node may send an uplink service flow to the third-party server, and the third-party server sends a downlink service flow to the edge node.

808. The edge node accumulates traffic usage of interaction between the third-party server and the UE.

809. The edge node sends a traffic report request to the central node.

Specifically, the edge node may periodically report traffic to the central node by using an out-of-band message.

810. The central node performs charging processing according to traffic reported by the edge node.

Specifically, according to the traffic reported by the edge node, the central node obtains a corresponding MSISDN by using a UE IP and performs charging processing. The central node may return a charging processing result to the edge node by using an out-of-band message. The central node may send a charging request to a charging system, and the charging system returns a charging response to the central node.

811. The central node sends a traffic report response to the edge node.

812. The edge node performs control processing according to a charging processing result.

Specifically, a process of performing, by the edge node, control processing may include:

if the charging processing succeeds, keeping delivering data to the UE; or if the charging processing fails, stopping delivering data to the UE.

In addition, charging may be further performed on the third-party server in this embodiment of the present invention. The central node may learn of retrieval traffic of the edge node, and perform backward charging on the third-party server for this part of traffic. Alternatively, the central node may learn of traffic delivered to the UE by the edge node, and perform backward charging on the third-party server for this part of traffic.

Figure 9:
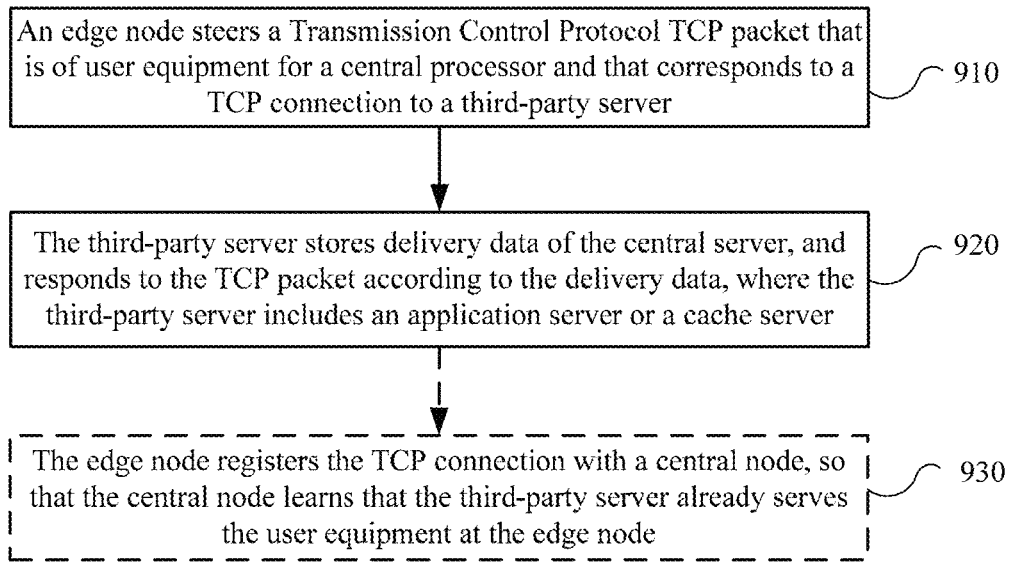
FIG. 9 is a schematic flowchart of a network communication method according to an embodiment of the present invention.

FIG. 9 is a schematic flowchart of a network communication method according to an embodiment of the present invention. The method may be executed by a network system. The network system to which the method is applied includes a third-party server and an edge node that are located in a radio access network or an Internet Protocol IP transport network between the radio access network and a wireless core network. The method shown in FIG. 9 may include the following steps.

910. The edge node steers a Transmission Control Protocol TCP packet that is of user equipment for a central server and corresponds to a TCP connection to the third-party server.

920. The third-party server stores delivery data of the central server, and responds to the TCP packet according to the delivery data, where the third-party server includes an application server or a cache server.

In this embodiment of the present invention, a cache server or an application server is moved from an IDC equipment room located in a metropolitan area network to a local radio access network or an IP transport network between the radio access network and a wireless core network, and an edge node is deployed to steer a TCP packet for a central server to the cache server or the application server, to implement traffic scheduling. In this way, a transmission delay from the radio access network to a packet core network is reduced, thereby improving user experience.

Optionally, in another embodiment, the network system further includes a central node located in the wireless core network, and the method further includes:

930. The edge node registers the TCP connection with a central node, so that the central node learns that the third-party server has already served the user equipment at the edge node.

Optionally, in another embodiment, in step 910, the edge node may determine and store an IP address that needs to be steered; and perform destination network address translation DNAT on the TCP packet according to the IP address that needs to be steered, so as to steer the TCP packet to the third-party server.

Optionally, in another embodiment, that the edge node determines an IP address that needs to be steered includes: parsing, by the edge node, a domain name system DNS response message corresponding to a DNS request message sent by the user equipment, to obtain the IP address that needs to be steered.

Optionally, in another embodiment, that the edge node determines an IP address that needs to be steered includes: obtaining, by the edge node from a network management system, the IP address that needs to be steered.

Optionally, in another embodiment, that the edge node determines an IP address that needs to be steered includes: obtaining, by the edge node from the central node, the IP address that needs to be steered.

Optionally, in another embodiment, in step 910, if traffic is steered to the locally deployed third-party server by using an DNS hijacking method, the edge node may receive a DNS request message sent by the user equipment; and send a DNS response message to the user equipment. The DNS response message carries an IP address of the third-party server.

Optionally, in another embodiment, when the edge node steers traffic to the locally deployed third-party server by parsing the DNS response message, the method shown in FIG. 9 further includes the following steps: The central node is further configured to: replicate and encapsulate an uplink TCP packet sent by the user equipment, and forward a replicated and encapsulated uplink TCP packet to the edge node, so that the edge node learns that the user equipment has already been handed over from a first base station cell to a second base station cell. The edge node is further configured to: after decapsulating the replicated and encapsulated uplink TCP packet, perform DNAT on the uplink TCP packet according to the IP address that needs to be steered, and forward a translated uplink TCP packet to the third-party server; and after performing source network address translation on a downlink TCP packet received from the third-party server, replicate and encapsulate a translated downlink TCP packet, and forward a replicated and encapsulated downlink TCP packet to the central node. The central node is further configured to: after decapsulating the replicated and encapsulated downlink TCP packet, forward a decapsulated downlink TCP packet to the user equipment.

Optionally, in another embodiment, when the edge node steers traffic to the locally deployed third-party server by hijacking the DNS request message, the method shown in FIG. 9 further includes the following steps: The central node is further configured to: replicate and encapsulate an uplink TCP packet sent by the user equipment, and forward a replicated and encapsulated uplink TCP packet to the edge node, so that the edge node learns that the user equipment has already been handed over from a first base station cell to a second base station cell. The edge node is further configured to: after decapsulating the replicated and encapsulated uplink TCP packet, forward the uplink TCP packet to the third-party server; and replicate and encapsulate a downlink TCP packet received from the third-party server, and forward a replicated and encapsulated downlink TCP packet to the central node. The central node is further configured to: after decapsulating the replicated and encapsulated downlink TCP packet, forward a decapsulated downlink TCP packet to the user equipment.

Optionally, in another embodiment, the method shown in FIG. 9 further includes: when a first edge node is deployed in the second base station cell, determines, by the first edge node according to whether the uplink TCP packet belongs to a newly established TCP connection, whether the uplink TCP packet is steered to a third-party server corresponding to the second base station cell.

Optionally, in another embodiment, the method shown in FIG. 9 further includes: performing, by the central node, data delivery on the third-party server according to location information of an edge node.

Optionally, in another embodiment, the method shown in FIG. 9 further includes: reporting, by the edge node, traffic usage of interaction between the third-party server and the user equipment to the central node; and performing, by the central node, charging processing according to the reported traffic usage, so that a charging system performs charging.

Optionally, in another embodiment, the method shown in FIG. 9 further includes: obtaining, by the third-party server from the central server, data corresponding to the IP address that needs to be steered.

In the embodiments of the present invention, a cache server or an application server is moved from an IDC equipment room located in a metropolitan area network to a local radio access network or an IP transport network between the radio access network and a wireless core network, and an edge node is deployed to steer a TCP packet for a central server to the cache server or the application server, to implement traffic scheduling. In this way, a transmission delay from the radio access network to a packet core network is reduced, thereby improving user experience.

In addition, the central node is deployed in the wireless core network, and the edge node and the central node can cooperate to resolve a mobility problem caused by a base station handover of the user equipment, so as to ensure continuity and integrity of a user service. In addition, functions such as data retrieval, data delivery, and charging can be implemented. In this way, the third-party server does not need to be modified or moved, thereby reducing an overall transmission delay of user service access and improving user experience.

It should be understood that "one embodiment" or "an embodiment" mentioned in the whole specification means that particular features, structures, or characteristics related to the embodiment are included in at least one embodiment of the present invention. Therefore, "in one embodiment" or "in an embodiment" appearing throughout the specification does not necessarily refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should be further understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may be or may not be physically separate, and parts displayed as units may be or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. In addition, any connection may be appropriately defined as a computer-readable medium.

In summary, what is described above is merely example embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A network system, used for content delivery, comprising:
   a first third-party server and a first edge node that are located in a radio access network or an Internet Protocol (IP) transport network between the radio access network and a wireless core network, a central node located in the wireless core network,
   wherein the first edge node is configured to steer a Transmission Control Protocol (TCP) packet that is of a terminal device for a central server and that corresponds to a TCP connection, to the first third-party server, and
   wherein the first third-party server comprises an application server or a cache server, and wherein the first third-party server is configured to store delivery data of the central server and respond to the TCP packet according to the delivery data, and
   wherein when the terminal device is handed over from a first base station cell that comprises the first third-party server and the first edge node to a second base station cell that comprises a second edge node,
   the central node is further configured to: forward an uplink TCP packet, sent by the terminal device, to the first edge node;
   the first edge node is further configured to: forward the uplink TCP packet to the first third-party server; and after receiving a downlink TCP packet from the first third-party server, forward the downlink TCP packet to the central node;
   the central node is further configured to: forward the downlink TCP packet to the terminal device through the second edge node.

2. The network system according to claim 1, wherein the first edge node is further configured to register the TCP connection with the central node.

3. The network system according to claim 1, wherein the first edge node is specifically configured to:
   determine and store an IP address that needs to be steered; and
   perform destination network address translation (DNAT) on the TCP packet according to the IP address that needs to be steered, so as to steer the TCP packet to the third-party server.

4. The network system according to claim 3, wherein the first edge node is specifically configured to parse a domain name system (DNS) response message corresponding to a DNS request message sent by the terminal device, to obtain the IP address that needs to be steered;
   the first edge node is specifically configured to obtain, from a network management system, the IP address that needs to be steered; or
   the first edge node is specifically configured to obtain, from the central node, the IP address that needs to be steered.

5. The network system according to claim 1, wherein the first edge node is specifically configured to:

receive a DNS request message sent by the terminal device; and send a DNS response message to the terminal device, wherein the DNS response message carries an IP address of the first third-party server.

6. The network system according to claim 3, wherein, the central node is configured to: replicate and encapsulate an uplink TCP packet sent by the terminal device, and forward a replicated and encapsulated uplink TCP packet to the first edge node, so that the first edge node learns that the terminal device has already been handed over from the first base station cell to the second base station cell;

the first edge node is configured to: after decapsulating the replicated and encapsulated uplink TCP packet, perform DNAT on the uplink TCP packet according to the IP address that needs to be steered, and forward a translated uplink TCP packet to the first third-party server; and after performing source network address translation (SNAT) on a downlink TCP packet received from the first third-party server, replicate and encapsulate a translated downlink TCP packet, and forward a replicated and encapsulated downlink TCP packet to the central node; and the central node is configured to: after decapsulating the replicated and encapsulated downlink TCP packet, forward a decapsulated downlink TCP packet to the second edge node;

the second edge node is configured to: forward the decapsulated downlink TCP packet to the terminal device.

7. The network system according to claim 5, wherein, the central node is configured to: replicate and encapsulate an uplink TCP packet sent by the terminal device, and forward a replicated and encapsulated uplink TCP packet to the first edge node, so that the first edge node learns that the terminal device has already been handed over from the first base station cell to the second base station cell;

the first edge node is configured to: after decapsulating the replicated and encapsulated uplink TCP packet, forward the uplink TCP packet to the first third-party server; replicate and encapsulate a downlink TCP packet received from the first third-party server, and forward a replicated and encapsulated downlink TCP packet to the central node; and the central node is configured to: after decapsulating the replicated and encapsulated downlink TCP packet, forward a decapsulated downlink TCP packet to the second edge node;

the second edge node is configured to: forward the decapsulated downlink TCP packet to the terminal device.

8. The network system according to claim 1, wherein:

the second edge node is configured to determine, according to whether the uplink TCP packet belongs to a newly established TCP connection, whether the uplink TCP packet is steered to a second third-party server corresponding to the second base station cell.

9. The network system according to claim 2, wherein the central node is further configured to perform data delivery on the first third-party server according to location information of the first edge node.

10. The network system according to claim 2, wherein the first edge node is further configured to report traffic usage of interaction between the first third-party server and the terminal device to the central node; and wherein the central node is further configured to perform charging processing according to the reported traffic usage, so that a charging system performs charging.

11. The network system according to claim 1, wherein the first third-party server is further configured to obtain, from the central server, data corresponding to the IP address that needs to be steered.

12. A network communication method, the method comprises:

steering, by a first edge node, a Transmission Control Protocol (TCP) packet that is of a terminal device for a central server and that corresponds to a TCP connection, to a first third-party server, wherein the the first third-party server and the first edge node are located in a radio access network or an IP transport network between the radio access network and a wireless core network; and responding to the TCP packet according to the stored delivery data of the central server, wherein the first third-party server comprises an application server or a cache server;

and when the terminal device is handed over from a first base station cell that comprises the first third-party server and the first edge node to a second base station cell that comprises a second edge node, the method further comprises:

forwarding, by a central node, an uplink TCP packet that is sent by the terminal device, to the first edge node, wherein the central node is located in the wireless core network;

steering, by the first edge node, the uplink TCP packet to the first third-party server;

after receiving a downlink TCP packet from the first third-party server, forwarding, by the first edge node, the downlink TCP packet to the central node;

forwarding, by the central node, the downlink TCP packet to the terminal device through the second edge node.

13. The method according to claim 12, wherein the method further comprises:

registering, by the first edge node, the TCP connection with the central node.

14. The method according to claim 12, wherein the steering, by the first edge node, a TCP packet that is of a terminal device for a central server and that corresponds to a TCP connection to the first third-party server comprises:

determining and storing, by the first edge node, an IP address that needs to be steered; and performing destination network address translation (DNAT) on the TCP packet according to the IP address that needs to be steered, so as to steer the TCP packet to the first third-party server.

15. The method according to claim 14, wherein the determining, by the first edge node, an IP address that needs to be steered comprises:

parsing, by the first edge node, a DNS response message corresponding to a DNS request message sent by the terminal device, to obtain the IP address that needs to be steered; or obtaining, by the first edge node from a network management system, the IP address that needs to be steered; or obtaining, by the first edge node from the central node, the IP address that needs to be steered.

16. The method according to claim 13, before the steering, by the first edge node, a TCP packet that is of a terminal device for a central server and that corresponds to a TCP connection to the first third-party server, further comprising:

receiving, by the first edge node, a DNS request message sent by the terminal device; and sending, by the first edge node, a DNS response message to the terminal device, wherein the DNS response message carries an IP address of the first third-party server.

17. The method according to claim 14, wherein the method comprises:

replicating and encapsulating, by the central node, an uplink TCP packet sent by the terminal device;

forwarding, by the central node, a replicated and encapsulated uplink TCP packet to the first edge node, so that the first edge node learns that the terminal device has already been handed over from the first base station cell to the second base station cell;

after decapsulating the replicated and encapsulated uplink TCP packet, performing, by the first edge node, DNAT on the uplink TCP packet according to the IP address that needs to be steered;

forwarding, by the first edge node, a translated uplink TCP packet to the first third-party server;

performing, by the first edge node, source network address translation (SNAT) on a downlink TCP packet received from the first third-party server, replicating and encapsulating, by the first edge node, a downlink TCP packet received by the first third-party server;

forwarding a replicated and encapsulated downlink TCP packet to the central node;

after decapsulating the replicated and encapsulated downlink TCP packet, forwarding, by the central node, a decapsulated downlink TCP packet to the second edge node;

forwarding, by the second edge node, the decapsulated downlink TCP packet to the terminal device.

18. The method according to claim 16, wherein the method comprises:

replicating and encapsulating, by the central node, an uplink TCP packet sent by the terminal device;

forwarding, by the central node, a replicated and encapsulated uplink TCP packet to the first edge node, so that the first edge node learns that the terminal device has already been handed over from the first base station cell to the second base station cell;

after decapsulating the replicated and encapsulated uplink TCP packet, forwarding, by the first edge node, the uplink TCP packet to the first third-party server;

replicating and encapsulating, by the first edge node, a downlink TCP packet received from the first third-party server;

forwarding, by the first edge node, a replicated and encapsulated downlink TCP packet to the central node; and after decapsulating the replicated and encapsulated downlink TCP packet, forwarding, by the central node, a decapsulated downlink TCP packet to the second edge node;

forwarding, by the second edge node, the decapsulated downlink TCP packet to the terminal device.

19. The method according to claim 12, wherein the method further comprises:

determining, by the second edge node according to whether the uplink TCP packet belongs to a newly established TCP connection, whether the uplink TCP packet is steered to a second third-party server corresponding to the second base station cell.

20. The method according to claim 13, wherein the method further comprises:

performing, by the central node, data delivery on the first third-party server according to location information of the first edge node.

* * * * *

UNITED STATES PATENT AND TRADEMARK OFFICE
CERTIFICATE OF CORRECTION

PATENT NO.       : 10,785,780 B2
APPLICATION NO.  : 15/907162
DATED            : September 22, 2020
INVENTOR(S)      : Zanfeng Yang Page 1 of 1

It is certified that error appears in the above-identified patent and that said Letters Patent is hereby corrected as shown below:

In the Claims

In Column 24, Line 13, in Claim 12, delete "the the" and insert -- the --, therefor.

Signed and Sealed this
Fifth Day of January, 2021

Andrei Iancu
*Director of the United States Patent and Trademark Office*